United States Patent
Barnum et al.

(10) Patent No.: US 8,818,125 B2
(45) Date of Patent: Aug. 26, 2014

(54) SCENE ADAPTIVE FILTER DESIGN FOR IMPROVED STEREO MATCHING

(71) Applicant: Texas Instruments Incorporated, Dallas, TX (US)

(72) Inventors: Peter Charles Barnum, Dallas, TX (US); Goksel Dedeoglu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 134 days.

(21) Appl. No.: 13/647,449

(22) Filed: Oct. 9, 2012

(65) Prior Publication Data

US 2013/0089269 A1   Apr. 11, 2013

Related U.S. Application Data

(60) Provisional application No. 61/544,429, filed on Oct. 7, 2011.

(51) Int. Cl.
*G06K 9/40* (2006.01)
*G06T 5/50* (2006.01)
*G06T 5/00* (2006.01)

(52) U.S. Cl.
CPC ......... *G06T 5/50* (2013.01); *G06T 2207/20224* (2013.01); *G06T 2207/10012* (2013.01); *G06T 5/003* (2013.01)
USPC ........................................................ 382/261

(58) Field of Classification Search
USPC ............... 348/42, 51; 352/57, 239; 353/7; 359/376, 458; 367/45; 370/290; 379/406.08; 381/71.11; 382/261; 396/324
See application file for complete search history.

(56) References Cited

U.S. PATENT DOCUMENTS

| | | | | |
|---|---|---|---|---|
| 4,783,840 | A * | 11/1988 | Song | 382/261 |
| 6,608,942 | B1 * | 8/2003 | Le | 382/279 |
| 7,038,810 | B1 * | 5/2006 | Yamazoe et al. | 358/1.9 |
| 7,110,455 | B2 * | 9/2006 | Wu et al. | 375/240.16 |
| 7,379,615 | B2 * | 5/2008 | Allouche | 382/260 |
| 8,160,301 | B2 * | 4/2012 | Morimitsu | 382/106 |
| 8,582,032 | B2 * | 11/2013 | Zhai et al. | 348/452 |
| 2002/0076117 | A1 * | 6/2002 | Allred et al. | 382/261 |
| 2010/0027905 | A1 * | 2/2010 | Zhang et al. | 382/261 |
| 2010/0278267 | A1 | 11/2010 | Lai et al. | |
| 2013/0089269 | A1 * | 4/2013 | Barnum et al. | 382/261 |

OTHER PUBLICATIONS

Filip Mroz and Toby P. Breckon, "An Empirical Comparison of Real-Time Dense Stereo Approaches for Use in the Automotive Environment," EURASIP Journal on Image and Video Processing 2012, Aug. 16, 2012, pp. 1-40.

Heiko Hirschmüeller, "Stereo Processing by Semiglobal Matching and Mutual Information," IEEE Transactions on Pattern Analysis and Machine Intelligence, vol. 30, No. 2, Feburary 2008, pp. 328-341.

Soo-Chang Pei and Ji-Hwei Horng, "Design of FIR Bilevel Laplacian-of-Gaussian Filter," Journal Signal Processing, vol. 82, Issue 4, Apr. 2002, pp. 677-691.

(Continued)

*Primary Examiner* — Gregory F Cunningham
(74) *Attorney, Agent, or Firm* — Mima George Abyad; Frederick J. Telecky, Jr.

(57) ABSTRACT

A method is provided that includes generating coefficients of a scene adaptive filter (SAF) based on differences between values of neighboring pixels in a representative two dimensional (2D) image, and applying the SAF to a plurality of corresponding 2D images.

15 Claims, 21 Drawing Sheets

(56) References Cited

OTHER PUBLICATIONS

D. Marr and E. Hildreth, "Theory of Edge Detection," Proceedings of the Royal Society of London, Series B, Biological Sciences, vol. 207, No. 1167, Feb. 29, 1980, pp. 187-217.

Daniel Scharstein and Richard Szeliski, "A Taxonomy and Evaluation of Dense Two-Frame Stereo Correspondence Algorithms", International Journal of Computer Vision, vol. 47, Issue 1-3, Apr.-Jun. 2002, pp. 7-42.

* cited by examiner

|     |     |     |     |     |     |     |     |     |
| --- | --- | --- | --- | --- | --- | --- | --- | --- |
| p0  | p1  | p2  | p3  | p4  | p5  | p6  | p7  | p8  |
| p9  | p10 | p11 | p12 | p13 | p14 | p15 | p16 | p17 |
| p18 | p19 | p20 | p21 | p22 | p23 | p24 | p25 | p26 |
| p27 | p28 | p29 | p30 | p31 | p32 | p33 | p34 | p35 |
| p36 | p37 | p38 | p39 | p40 | p41 | p42 | p43 | p44 |
| p45 | p46 | p47 | p48 | p49 | p50 | p51 | p52 | p53 |
| p54 | p55 | p56 | p57 | p58 | p59 | p60 | p61 | p62 |
| p63 | p64 | p65 | p66 | p67 | p68 | p69 | p70 | p71 |
| p72 | p73 | p74 | p75 | p76 | p77 | p78 | p79 | p80 |

FIG. 3A

|     |     |     |     |     |     |     |     |     |
| --- | --- | --- | --- | --- | --- | --- | --- | --- |
| p0  | p1  | p2  | p3  | p4  | p5  | p6  | p7  | p8  |
| p9  | p10 | p11 | p12 | p13 | p14 | p15 | p16 | p17 |
| p18 | p19 | p20 | p21 | p22 | p23 | p24 | p25 | p26 |
| p27 | p28 | p29 | p30 | p31 | p32 | p33 | p34 | p35 |
| p36 | p37 | p38 | p39 | p40 | p41 | p42 | p43 | p44 |
| p45 | p46 | p47 | p48 | p49 | p50 | p51 | p52 | p53 |
| p54 | p55 | p56 | p57 | p58 | p59 | p60 | p61 | p62 |
| p63 | p64 | p65 | p66 | p67 | p68 | p69 | p70 | p71 |
| p72 | p73 | p74 | p75 | p76 | p77 | p78 | p79 | p80 |

FIG. 3B

| p0 | p1 | p2 | p3 | p4 | p5 | p6 | p7 | p8 |
|----|----|----|----|----|----|----|----|----|
| p9 | p10 | p11 | p12 | p13 | p14 | p15 | p16 | p17 |
| p18 | p19 | p20 | p21 | p22 | p23 | p24 | p25 | p26 |
| p27 | p28 | p29 | p30 | p31 | p32 | p33 | p34 | p35 |
| p36 | p37 | p38 | p39 | p40 | p41 | p42 | p43 | p44 |
| p45 | p46 | p47 | p48 | p49 | p50 | p51 | p52 | p53 |
| p54 | p55 | p56 | p57 | p58 | p59 | p60 | p61 | p62 |
| p63 | p64 | p65 | p66 | p67 | p68 | p69 | p70 | p71 |
| p72 | p73 | p74 | p75 | p76 | p77 | p78 | p79 | p80 |

FIG. 3C

| p0 | p1 | p2 | p3 | p4 | p5 | p6 | p7 | p8 |
|----|----|----|----|----|----|----|----|----|
| p9 | p10 | p11 | p12 | p13 | p14 | p15 | p16 | p17 |
| p18 | p19 | p20 | p21 | p22 | p23 | p24 | p25 | p26 |
| p27 | p28 | p29 | p30 | p31 | p32 | p33 | p34 | p35 |
| p36 | p37 | p38 | p39 | p40 | p41 | p42 | p43 | p44 |
| p45 | p46 | p47 | p48 | p49 | p50 | p51 | p52 | p53 |
| p54 | p55 | p56 | p57 | p58 | p59 | p60 | p61 | p62 |
| p63 | p64 | p65 | p66 | p67 | p68 | p69 | p70 | p71 |
| p72 | p73 | p74 | p75 | p76 | p77 | p78 | p79 | p80 |

```
   RIGHT        LEFT
0   0   0    0   0   0
1   0   0    2   1   0
0   6   1    0   0   6
```
FIG. 4B

```
   RIGHT        LEFT
1   0   0    2   1   0
0   6   1    0   0   6
1   4   1    2   1   4
```
FIG. 4C

```
   RIGHT        LEFT
0   6   1    0   0   6
1   4   1    2   1   4
2   2   0    2   2   2
```
FIG. 4D

| p0 | p1 | p2 | p3 | p4 | p5 | p6 | p7 | p8 |
|---|---|---|---|---|---|---|---|---|
| p9 | p10 | p11 | p12 | p13 | p14 | p15 | p16 | p17 |
| p18 | p19 | p20 | p21 | p22 | p23 | p24 | p25 | p26 |
| p27 | p28 | p29 | p30 | p31 | p32 | p33 | p34 | p35 |
| p36 | p37 | p38 | p39 | p40 | p41 | p42 | p43 | p44 |
| p45 | p46 | p47 | p48 | p49 | p50 | p51 | p52 | p53 |
| p54 | p55 | p56 | p57 | p58 | p59 | p60 | p61 | p62 |
| p63 | p64 | p65 | p66 | p67 | p68 | p69 | p70 | p71 |
| p72 | p73 | p74 | p75 | p76 | p77 | p78 | p79 | p80 |

SCENE ADAPTIVE FILTER DESIGN FOR IMPROVED STEREO MATCHING

CROSS-REFERENCE TO RELATED APPLICATIONS

This application claims benefit of U.S. Provisional Patent Application Ser. No. 61/544,429, filed Oct. 7, 2011, which is incorporated herein by reference in its entirety.

BACKGROUND OF THE INVENTION

1. Field of the Invention

Embodiments of the present invention generally relate to preprocessing of stereo images.

2. Description of the Related Art

Objects at different depths in the scene of a stereoscopic video sequence will have different displacements, i.e., disparities, in left and right frames of the stereoscopic video sequence, thus creating a sense of depth when the stereoscopic images are viewed on a stereoscopic display. The term disparity refers to the shift that occurs at each pixel in a frame between the left and right images due the different perspectives of the cameras used to capture the two images. The amount of shift or disparity may vary from pixel to pixel depending on the depth of the corresponding 3D point in the scene.

In many stereo vision applications, it is important to know the depths of objects in a scene. The depth information for a stereo frame or image is typically computed from the disparities between the pixels in the left image and corresponding pixels in the right image because depth is proportional to the reciprocal of the disparity. To determine the disparities, a stereo matching algorithm is applied to a stereo image.

Further, in many applications, the stereo images are filtered before the images are analyzed for correspondence by the stereo matching algorithm. The purpose of this filtering step may be to filter out the low-frequency image signal that tends to capture undesired illumination and exposure differences between the stereo cameras, to amplify the high-frequency texture of the scene to facilitate the stereo matching process, and/or to reduce the effect of image sensor noise.

A number of stereo image pre-processing techniques implement the above ideas to make stereo matching algorithms more robust against noise and illumination. In particular, the Laplacian-of-Gaussian (LoG) filter as described in D. Marr and E. Hildreth, "Theory of Edge Detection", Proceedings of the Royal Society of London, Series B, Biological Sciences, Vol. 207, No. 1167, Feb. 29, 1980, pp. 187-217 (Marr herein), and efficient variants and approximations thereof such as those described in Soo-Chang Pei and Ji-Hwei Horng, "Design of FIR Bilevel Laplacian-of-Gaussian Filter", Signal Processing, Vol. 82, Issue 4, April 2002, pp. 677-691, are very popular.

SUMMARY

Embodiments of the present invention relate to methods, apparatus, and computer readable media for scene adaptive filtering. In one aspect, a method is provided that includes generating coefficients of a scene adaptive filter (SAF) based on differences between values of neighboring pixels in a representative two dimensional (2D) image, and applying the SAF to a plurality of corresponding 2D images.

In one aspect, an apparatus is provided that includes means for generating coefficients of a scene adaptive filter (SAF) based on differences between values of neighboring pixels in a representative two dimensional (2D) image, and means for applying the SAF to a plurality of corresponding 2D images.

In one aspect, a non-transitory computer readable medium storing software instructions is provided. The software instructions, when executed by a processor, cause the performance of a method that includes generating coefficients of a scene adaptive filter (SAF) based on differences between values of neighboring pixels in a representative two dimensional (2D) image, and applying the SAF to a plurality of corresponding 2D images.

BRIEF DESCRIPTION OF THE DRAWINGS

Particular embodiments will now be described, by way of example only, and with reference to the accompanying drawings:

FIGS. 3A-3F, 4A-4F, and 6 are examples;

FIG. 7 is a graphical representation of a learned pseudo-log box filter;

DETAILED DESCRIPTION OF EMBODIMENTS OF THE INVENTION

Figure 1:
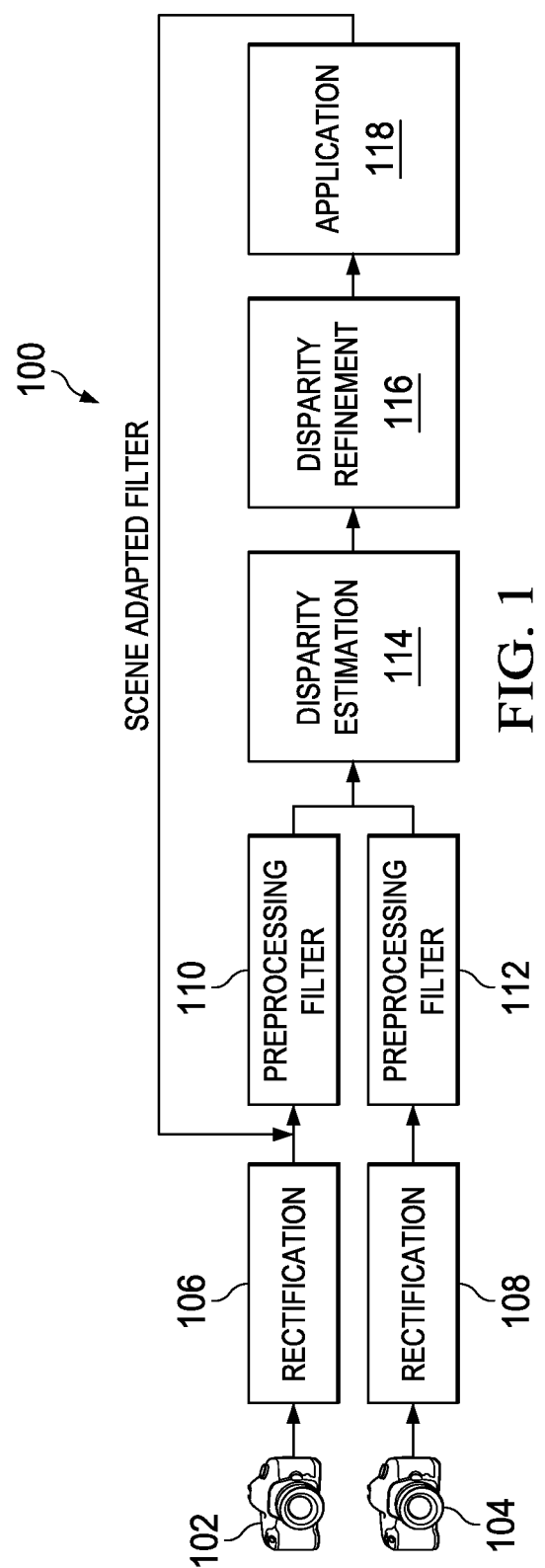
FIG. 1 is a block diagram of a stereo image processing system.

Specific embodiments of the invention will now be described in detail with reference to the accompanying figures. Like elements in the various figures are denoted by like reference numerals for consistency.

Embodiments of the invention provide a new approach for the design of a pre-processing filter which is referred to herein as a "scene adaptive filter" (SAF). This filter is derived from the metrics and methods of the very problem it is meant to improve, namely, stereo matching.

The stereo matching problem can be stated as follows: for each pixel in the left image, find the coordinates of the corresponding pixel in the same row in the right image. A typical "correlation-based" stereo algorithm estimates the correspondence by measuring the matching score between a pixel in the left image and an array of potential matching pixels in the right image. A common approach is to use a small image patch or window (e.g., 7×7 pixels) around the pixel of interest, and to evaluate the Sum-of-Absolute-Differences (SAD) or Sum-of-Squared-Differences (SSD) between the left and right image patches.

This idea of window-based image matching is applied to design an SAF. Consider a left image pixel L(x, y), where x and y indicate image coordinates. The desired outcome of applying a preprocessing filter is that L(x, y) is the best match for the corresponding pixel in the right image, e.g., there should be a small SAD score for the match, and at the same time, not match other pixels at all, e.g., should have high SAD score with the other pixels. The goal is to define a transformation of the image that implements this matching behavior for all the pixels. Ideally, this transformation would take the form of a computationally efficient pre-processing filter, such as the LoG filter of Marr, which can be implemented as a discrete image convolution operator.

As correct correspondence information is not known, the left image L is treated as a proxy for the correctly corresponding pixel intensities in the right image R. A stereo matching algorithm presented with two copies of the left image should estimate zero disparity at every pixel. Thus, any non-zero disparities are, by definition errors. A preprocessing filter can be optimized using this information to encourage the correct correspondences. More specifically, the match of L(x, y) with its neighboring pixels along the scan line is evaluated. Let P(x, y) be the M×N image patch centered on L(x, y) and P(x+k, y) be an M×N image patch that is shifted by k pixels to the right.

Consider the set of vector differences $$D(x,y,k) = P(x,y) - P(x+k,y)$$

$$D\text{set} = \{D(x,y,k) \text{ for } d\text{Min} < k < d\text{Max}\}$$

where dMin and dMax define the range of disparities of interest. Dset is a collection of multi-dimensional vectors encoding how a local image patch is different from other local patches within a dMax-dMin pixel horizontal range. For all x and y, and k=0, D(x, y, 0) is a zero vector. That is, every image patch matches itself perfectly. Ideally, the value of D at k=0 should be minimized and the value of D should be maximized at all other values of k.

FIG. 1 is a block diagram of a stereo image processing system 100. The system 100 includes left and right imaging components (cameras) 102, 104, two rectification components 106, 108, two preprocessing filter components 110, 112, a disparity estimation component 114, a disparity refinement component 116, and an application component 118. The components of the stereo image processing system 100 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions may be stored in memory (not shown) and executed by one or more processors.

The left and right imaging components 102, 104 include imaging sensor systems arranged to capture image signals of a scene from a left viewpoint and a right viewpoint. That is, the imaging sensor system of the left imaging component 102 is arranged to capture an image signal from the left viewpoint, i.e., a left analog image signal, and the imaging sensor system of the right imaging component 104 is arranged to capture an image signal from the right view point, i.e., a right analog image signal. Each of the imaging sensor systems may include a lens assembly, a lens actuator, an aperture, and an imaging sensor. The imaging components 102, 104 also include circuitry for controlling various aspects of the operation of the respective image sensor systems, such as, for example, aperture opening amount, exposure time, etc. The imaging components 102, 104 also include functionality to convert the respective left and right analog image signals to left and right digital image signals, and to provide the left and right digital image signals to the respective rectification components 106, 108.

The rectification components 106, 108 process the respective left and right digital images to align the epipolar lines to be parallel with the scan lines of the images. This rectification is performed to compensate for camera distortions such as lens distortion, sensor tilting, and offset from the focal axis and for image planes that are not co-planar and/or not row aligned as the result of a non-ideal camera pair set up. Any suitable rectification techniques may be used, such as, e.g., bilinear interpolation or spline interpolation. The particular rectification processing performed may depend on the application 118 using the stereo images. Although not specifically shown, the rectified left and right images are also provided to the application component 118.

The preprocessing filter components 110, 112 filter the respective rectified left and right images using an SAF to improve the images for the stereo matching process performed by the disparity estimation component 114. The filtering is performed to, for example, filter out the low frequency image signal that tends to capture undesired illumination and exposure differences between the left and right imaging components 102, 104, amplify the high frequency texture of the scene, and/or reduce the effects of image sensor noise. The preprocessing filter components 110, 112 receive the SAF from the application 118. The preprocessing filter components 110, 112 operate to convolve the SAF with the respective image to generate a filtered image.

The disparity estimation component 114 receives the rectified, filtered left and right images and generates a disparity image of the stereo image. The disparity estimation component 114 may implement any suitable stereo correspondence algorithm for generation of the disparity image. Some suitable stereo correspondence algorithms are described in D. Scharstein and R. Szeliski, "A Taxonomy and Evaluation of Dense Two-Frame Stereo Correspondence Algorithms," International Journal of Computer Vision, Vol. 47, No. 1-3, April-June 2002, pp. 7-42. In some embodiments, the disparity estimation component 114 implements a local (window-based) stereo correspondence algorithm.

The disparity refinement component 116 performs processing to refine the disparity image as it is expected that some part of the disparity image may be incorrect. Any suitable refinement technique or techniques may be used. For example, a disparity confidence measure such as the one described in F. Mroz and T. Breckon, "An Empirical Comparison of Real-Time Dense Stereo Approaches for Use in the Automotive Environment," EURASIP Journal on Image and Video Processing, Aug. 16, 2012, pp. 1-40, may be utilized to identify and correct such regions. In another example, a median filter with a small window, e.g., 3×3, may be applied to smooth and remove irregularities such as outliers and peaks. In another example, interpolation may be performed to remove small holes in the disparity image. In another example, sub-pixel interpolation may be performed to increase the accuracy of the disparity image. Some suitable disparity refinement techniques that may be used are described in H. Hirschmüller, "Stereo Processing by Semi-Global Matching and Mutual Information," IEEE Transactions on Pattern Analysis and Machine Intelligence, Vol. 30, No. 2, February 2008, pp. 328-341.

The application component 118 receives the disparity image and performs any additional processing needed for the particular application. The application component 118 may implement any application or applications that rely on a three-dimensional (3D) representation of a scene. For example, the application component 118 may be an automotive forward collision warning application that calculates how far an object is from the vehicle, tracks the object over time to determine if the vehicle is rapidly approaching it, and warns the driver of an impending collision. In another example, the application component 118 may be an automotive pedestrian detection application. In another example, the application component 118 may be a 3D video conference call application that supports background replacement. In another example, the application component 118 may be a 3D person tracking application. In another example, the application component 118 may be a 3D surveillance application.

The application component 118 includes functionality to design an SAF to be applied by the preprocessing filter components 110, 112. When the system 100 is activated, there may be an initialization period during which the preprocessing filter components 110, 112 are not activated and the application component 118 designs an SAF for the preprocessing filter components 110, 112. More specifically, during the initialization period, the left and right imaging components 102, 104 are activated and begin capturing the corresponding left and right images that form stereo images. The application component 118 receives the corresponding rectified left and right images, chooses a representative stereo image, and designs an SAF based on one of the two dimensional (2D) images of the representative stereo image. The SAF is then provided to the preprocessing filter components 110, 112, these components are activated, and the system 100 begins normal operation.

Further, in some embodiments, because the scene being captured may change in some significant way, the application component designs new SAFs as video sequences are processed and provides the new SAFs to the preprocessing filter components 110, 112. The new SAFs may have differing frequency responses that compensate for changes in the scene. The criteria used by the application component 118 to decide when to design a new SAF may be application specific. For example, the application component 118 may periodically redesign the SAF, e.g., every N frames or every M seconds. In another example, the application component 118 may use more sophisticated criteria based on analysis of the scene and decide when a redesign is needed, similar to what is done to decide if a background model needs to be updated.

The SAF employed in the system 100 may be parametric or non-parametric. In a non-parametric M×N filter, each of the M×N coefficients is learned independently. In a parametric M×N filter, the M×N coefficients are determined by a small set of parameters, e.g., height, width, scale, etc. A method for designing a non-parametric SAF that may be used by the application component 118 is described herein in reference to FIG. 2. A method for designing a parametric SAF that may be used by the application component 118 is described herein in reference to FIG. 3.

Figure 2:
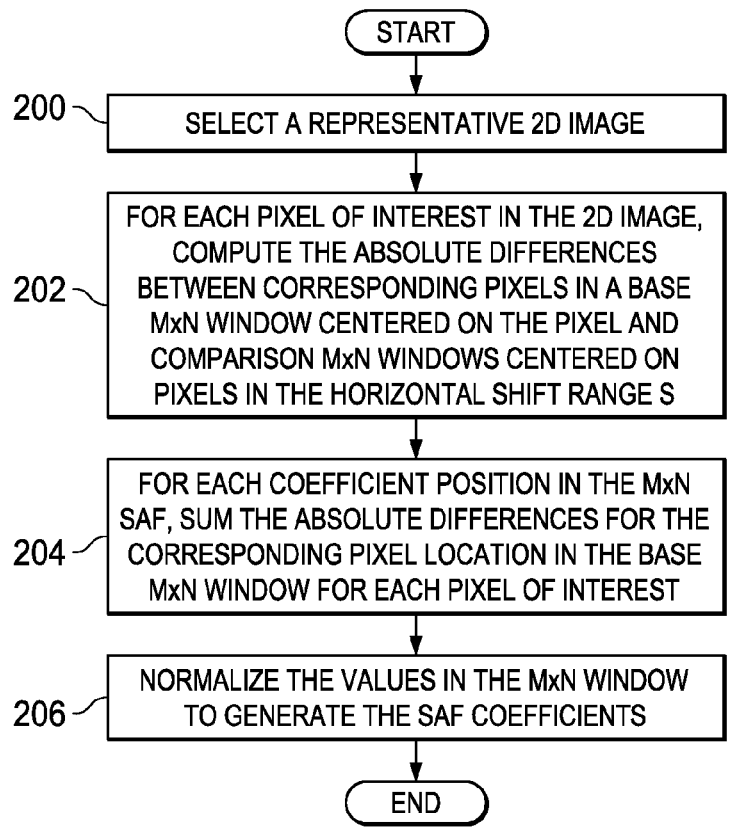
FIGS. 2 and 5 are flow diagrams of methods for designing a scene adaptive filter.

FIG. 2 is a flow diagram of a method for designing a non-parametric SAF. The resulting non-parametric SAF is an M×N finite impulse response (FIR) filter. Any suitable values for M and N may be used as long as the product of M and N is odd. Further, the values may be predetermined constants or may be configurable parameters. In some embodiments, the values of M and N are selected by the designer of system in which the method is implemented. In some embodiments, the values of M and N are selected by a user of the application implementing the method.

As is explained in more detail below, pixel-based computations are performed between a base M×N window and a comparison M×N window. The horizontal positions of the comparison M×N window relative to the base M×N window for each set of computations are within a shift range S to the left and to the right of the base M×N window. That is, S comparison windows to the right of the base window and S comparison windows to the left of the base window are used. Any suitable value for S may be used. In general, a suitable value is a value that is within the expected disparity range of the stereo images to be filtered. For example, S may be derived from the maximum disparity of the stereo cameras, e.g., the left and right imaging components 102, 104 of FIG. 1. Further, the value of S may be a predetermined constant or may be a configurable parameter. In some embodiments, the value of S is selected by the designer of the system in which the method is implemented. In some embodiments, the value of S is selected by a user of the application implementing the method.

Referring now to FIG. 2, initially a representative 2D image is selected 200. This representative 2D image may be either the left image or right image of a representative stereo image. In general, a representative image is an image that includes a distribution of the types of local variations that will be present in future images of interest. For example, for an automotive-vision system, a representative image may be one that includes road, cars, pedestrians, and signs, and areas in light and areas in shadow in a proportion similar to what is expected in actual use of a system. The representative image may be selected in any suitable way. For example, images captured by an imaging system may be automatically analyzed and selected based on some criteria. In another example, an image captured by an imaging system after a particular time period may be used. In another example, a user may monitor images captured by an imaging system and select the representative image. In some embodiments, the representative image is selected by a user during the initialization process of the system in which the method is implemented.

For each pixel of interest in the representative 2D image, the absolute differences between corresponding pixels in a base M×N window centered on the pixel and comparison M×N windows centered on pixels within the horizontal shift range S are computed. More specifically, let p(x,y) be the pixel of interest. There will be S comparison M×N windows to the right of the base M×N window, centered on p(x+1,y)...p(x+S,y) and S comparison M×N windows to the right of the base M×N window, centered on p(x-1,y)...p(x-S,y). The absolute differences between pixels in corresponding locations in the base M×N window and each of the comparison M×N windows are computed. That is, for the base M×N window B and a comparison M×N window C, the absolute differences computed are $|p(0,0)_B - p(0,0)_C|$, $|p(0,1)_B - p(0,1)_C|$, ... $|p(M-1, N-1)_B - p(M-1,N-1)_C|$ where p(0,0) is the pixel in the upper left corner of a window. Note that the absolute differences may also be computed such that the pixel from the comparison window is the first term and the pixel from the base window is the second term. Thus, M×N absolute differences are computed for one base window/comparison window. Further, 2S×M×N absolute differences are computed for each pixel of interest. Put another way, 2S absolute differences are computed for each pixel location p(x,y) in an M×N base window.

Figure 3E:
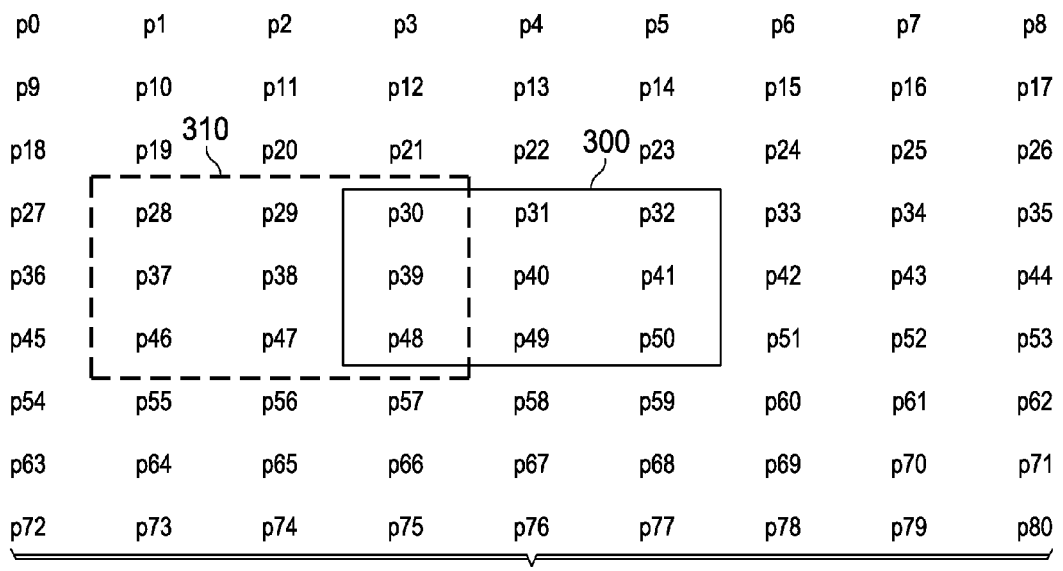
Figure 3F:
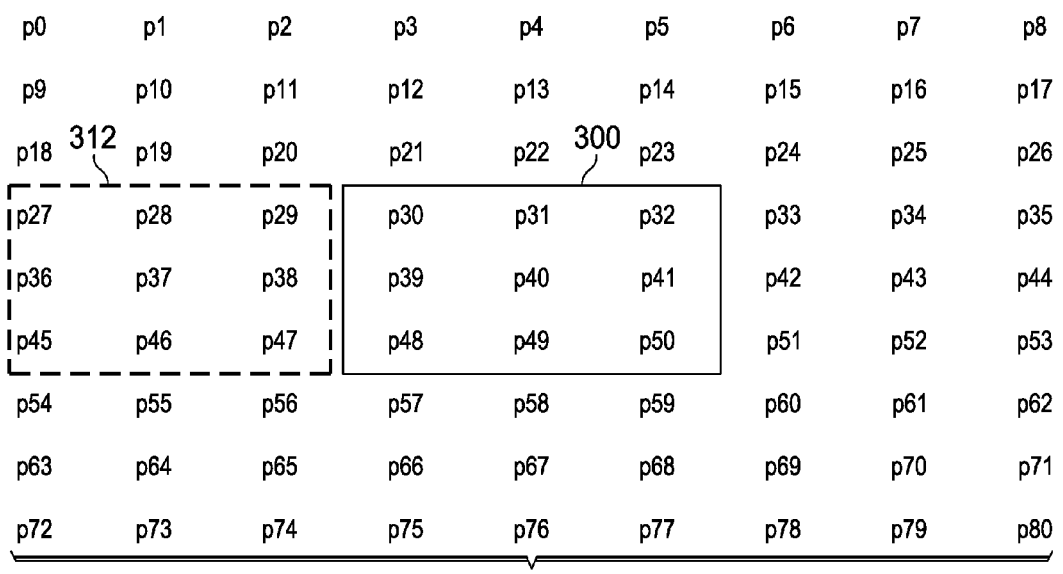

Consider the simple example of FIGS. 3A-3F. In this example, M=N=3 and S=3. Accordingly, there will be 2S=6 3×3 comparison windows for each pixel of interest. Assume that p40 is a pixel of interest. FIG. 3A illustrates the location of a comparison 3×3 window 302 shifted one pixel to the right of the pixel of interest in the base 3×3 window 300. FIG. 3B illustrates the location of a comparison 3×3 window 304 shifted two pixels to the right of the pixel of interest in the base 3×3 window 300. FIG. 3C illustrates the location of a comparison 3×3 window 306 shifted three pixels to the right of the pixel of interest in the base 3×3 window 300. FIG. 3D illustrates the location of a comparison 3×3 window 308 shifted one pixel to the left of the pixel of interest in the base 3×3 window 300. FIG. 3E illustrates the location of a comparison 3×3 window 310 shifted two pixels to the left of the pixel of interest in the base 3×3 window 300. FIG. 3F illustrates the location of a comparison 3×3 window 312 shifted three pixels to the left of the pixel of interest in the base 3×3 window 300.

For this example, 2S=6 absolute differences are computed for each of the nine pixel locations in the base window 300. More specifically, referring now to FIG. 3A, the absolute differences between corresponding pixels in the base 3×3 window 300 and the comparison 3×3 window 302 are computed between p30 and p31, p31 and p32, p32 and p33, p39 and p40, p40 and p41, p41 and p42, p48 and p49, p49 and p50, and p50 and p51. Referring now to FIG. 3B, the absolute differences between corresponding pixels in the base 3×3 window 300 and the comparison 3×3 window 304 are computed between p30 and p32, p31 and p33, p32 and p34, p39 and p41, p40 and p42, p41 and p43, p48 and p50, p49 and p51, and p50 and p52. Referring now to FIG. 3C, the absolute differences between corresponding pixels in the base 3×3 window 300 and the comparison 3×3 window 306 are computed between p30 and p33, p31 and p34, p32 and p35, p39 and p42, p40 and p43, p41 and p44, p48 and p51, p49 and p52, and p50 and p53.

Referring now to FIG. 3D, the absolute differences between corresponding pixels in the base 3×3 window 300 and the comparison 3×3 window 308 are computed between p30 and p29, p31 and p30, p32 and p31, p39 and p38, p40 and p39, p41 and p40, p48 and p47, p49 and p48, and p50 and p49. Referring now to FIG. 3E, the absolute differences between corresponding pixels in the base 3×3 window 300 and the comparison 3×3 window 310 are computed between p30 and p28, p31 and p29, p32 and p30, p39 and p37, p40 and p38, p41 and p39, p48 and p46, p49 and p47, and p50 and p48. Referring now to FIG. 3F, the absolute differences between corresponding pixels in the base 3×3 window 300 and the comparison 3×3 window 312 are computed between p30 and p27, p31 and p28, p32 and p29, p39 and p36, p40 and p37, p41 and p38, p48 and p45, p49 and p46, and p50 and p47.

In some embodiments, the pixels of interest are those pixels in the 2D representative image for which all pixels in the comparison M×N windows are available for the absolute difference computations. Accordingly, any pixel that is less than S+floor(N/2) pixels from the left or right boundary of the image and any pixel that is less than floor(M/2) pixels from the top or bottom boundary of the image is not a pixel of interest. Referring now to the example of FIG. 3A, recall that M=N=3. Thus, any pixel that is less than 4 pixels from the left and right boundaries of the image and any pixel that is less than 1 pixel from the top and bottom boundaries is not a pixel of interest as there are not sufficient columns or rows of samples for all of the needed comparison 3×3 windows. Fr example, p39 is not a pixel of interest in this example as it is three pixels from the left boundary but p40 is a pixel of interest as it is four pixels from the left boundary. Similarly, p3 is not a pixel of interest as it is less than one pixel away from the top boundary but p12 is a pixel of interest as it is one pixel away from the top boundary.

In some embodiments, all pixels in an image are pixels of interest. In such embodiments, if actual pixel values are not available for a comparison M×N window, values are provided to fill the locations of the unavailable pixels. Any suitable values may be used to fill the pixel locations. In some embodiments, the values of the unavailable pixels are assumed to be 0. In some embodiments, the values of the unavailable pixels are generated by replicating the nearest row or column of available pixels.

The pixels of interest may be determined in other suitable ways. For example, a subset block of pixels within the 2D image may be designated as the pixels of interest.

Referring again to FIG. 2, after the absolute difference computations are performed for each pixel of interest, the coefficients of the M×N SAF are generated 204, 206 from the 2S absolute differences computed for the corresponding pixel locations in the base M×N windows of the pixels of interest. First, for each coefficient position c(x,y) in the M×N SAF (x=0 . . . M, y=0 . . . N), the 2S absolute differences computed for the corresponding pixel p(x,y) in the base M×N window for each pixel of interest are summed 204 to generate a raw value for the coefficient. Thus, if there are Z pixels of interest in the representative 2D image, the raw value of each coefficient c(x,y) is the sum of Z*2S absolute differences for the corresponding pixel p(x,y).

The raw coefficient values are then normalized 206 to generate the final SAF coefficients. In general, the raw coefficients are normalized so that the output of the correlation between the filter and image will be within the range of 0-255. This may be achieved by normalizing the raw coefficients such that the final filter coefficients are small and have a mean of approximately zero. For example, the raw coefficient values c(x,y) may be scaled so that the maximum scaled coefficient value is 2, and 1 may be subtracted from each of the scaled coefficient values to generate the final coefficients, i.e., $c(x,y)=(c(x,y)*2/\text{max\_val})-1$, where max_val is the maximum raw coefficient value. The result is an M×N SAF in which each coefficient represents a computed degree of local variance.

Consider the simple example of FIGS. 4A-4F. Assume that M=N=3 and S=1. Since S=1, two comparison 3×3 windows are used for the absolute difference computations, one centered on the pixel immediately to the left of the pixel of interest and one centered on the pixel immediate to the right of the pixel of interest. The pixels of interest are those designated in the center column of FIG. 4A. FIG. 4B shows the results of the absolute difference computations between a base 3×3 window centered on p(1,4)=5 and the right and left comparison windows. FIG. 4B shows the results of the absolute difference computations between the base 3×3 window centered on p(1,4)=5 and the right and left comparison 3×3 windows centered on p(1,6) and p(1,3), respectively. FIG. 4C shows the results of the absolute difference computations between the base 3×3 window centered on p(2,4)=3 and the right and left comparison 3×3 windows centered on p(2,6) and p(2,3), respectively. FIG. 4D shows the results of the absolute difference computations between the base 3×3 window centered on p(3,4)=5 and the right and left comparison 3×3 windows centered on p(3,6) and p(3,3), respectively.

FIG. 4E shows the raw coefficient values for the SAF filter. The raw value for a coefficient c(x,y) is the sum of the absolute differences computed for the corresponding pixel p(x,y) in the base windows of pixels p(1,4), p(2,4), and p(3,4) of the image. For example, the raw value for coefficient c(1,1) is the sum of the values at location (1,1) in FIGS. 4A, 4B, and 4C, i.e., c(1,1)=0+1+6+0+4+1=12. FIG. 4F shows the final coefficient values after normalization according to $c(x,y)=(c(x,y)*2/\text{max\_val})-1$.

Figure 5:
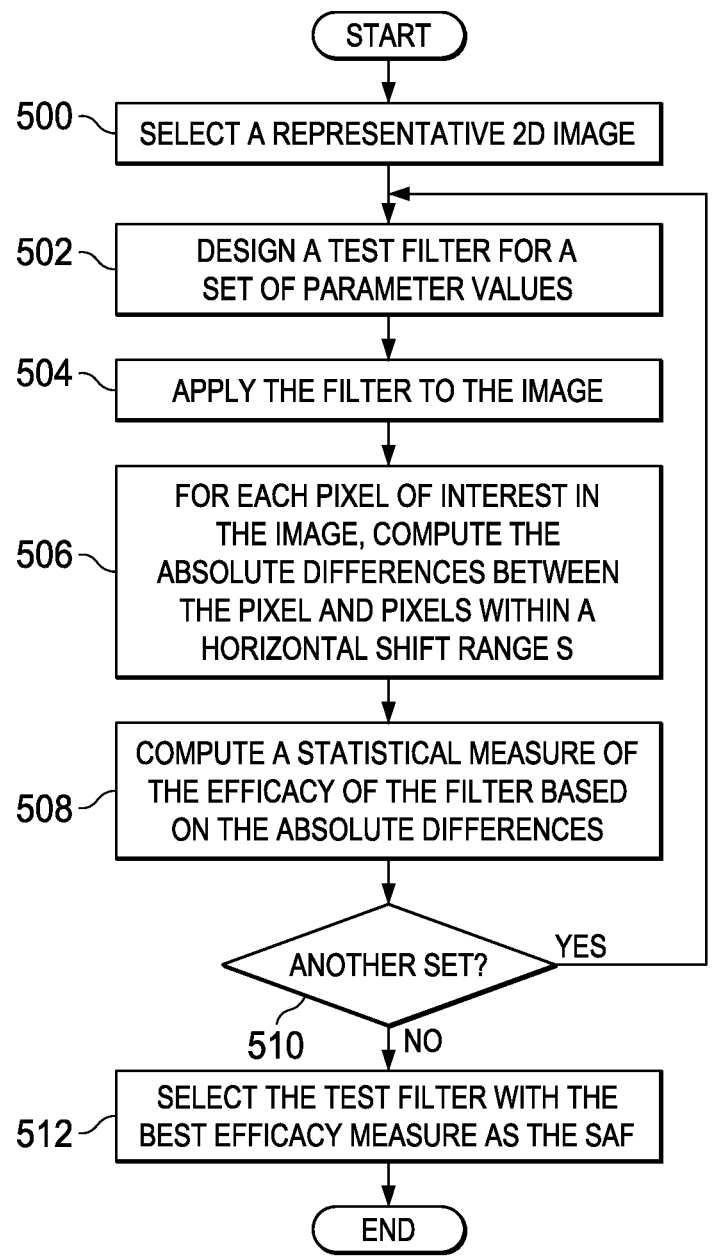

FIG. 5 is a flow diagram of a method for designing a parametric SAF. In general, a parametric filter is a filter in which the FIR coefficients are determined from a set of parameters that is smaller than the number of coefficients. The parametric SAF may be any suitable class of filter. For example, the parametric SAF may be a Haar wavelet filter with two or more box filters at different locations. As another example, the FIR coefficients for the parametric SAF may be defined by a polynomial in x and y. Other parametric models that may be used for the parametric SAF include Gaussians, Gabor filters, cosines, and piecewise linear segments. For simplicity of explanation, the method is explained using a parametric box filter as an example. Specifically, a pseudo-log filter or double-box filter with a small block inside a larger block is used as an example. The six parameters of this filter are the width, height and scale of the outer box and the width, height, and scale of the inner box.

As is explained in more detail below, pixel-based computations are performed between a pixels of interest and pixels with a horizontal shift range S to the left and right of the pixel. That is, the absolute differences between a pixel of interest and each of S sequential pixels immediately to the right of the pixel of interest and each of S sequential pixel immediately to the left of the pixel of interest are computed. Any suitable value for S may be used. In general, a suitable value is a value that is within the expected disparity range of the stereo images to be filtered. For example, S may be derived from the maximum disparity of the stereo cameras, e.g., the left and right imaging components 102, 104 of FIG. 1. Further, the value of S may be a predetermined constant or may be a configurable parameter. In some embodiments, the value of S is selected by the designer of the system in which the method is implemented. In some embodiments, the value of S is selected by a user of the application implementing the method.

In some embodiments, the pixels of interest are those pixels in the 2D representative image for which all pixels in the shift range S are available for the absolute difference computations. Accordingly, any pixel that is less than S pixels from the left or right boundary of the image is not a pixel of interest. Referring now to the example of FIG. 6, assume that S=3. Thus, any pixel that is less than 3 pixels from the left and right boundaries of the image is not a pixel of interest as there are not sufficient pixels for all of the needed absolute difference computations. For example, p2 is not a pixel of interest in this example as it is two pixels from the left boundary but p3 is a pixel of interest as it is three pixels from the left boundary. Similarly, p24 is not a pixel of interest in this example as it is two pixels from the right boundary but p23 is a pixel of interest as it is three pixels from the right boundary.

In some embodiments, all pixels in an image are pixels of interest. In such embodiments, if actual pixel values are not available, values are provided to fill the locations of the unavailable pixels. Any suitable values may be used to fill the pixel locations. In some embodiments, the values of the unavailable pixels are assumed to be 0. In some embodiments, the values of the unavailable pixels are generated by replicating the nearest row or column of available pixels.

The pixels of interest may be determined in other suitable ways. For example, a subset block of pixels within the 2D image may be designated as the pixels of interest.

Referring now to FIG. 5, initially a representative 2D image is selected 500. This representative 2D image may be either the left image or right image of a representative stereo image. Selection of a representative image is previously described herein in reference to FIG. 2.

A test filter is then designed for an initial set of parameter values 502 and the test filter is applied to the representative 2D image 504 by convolving the filter with the image. Then, for each pixel of interest in the filtered image, the absolute differences between the pixel and pixels in the horizontal shift range S are computed 506. That is, for a pixel p(x,y), 2S absolute differences are computed: |p(x,y)−p(x−1,y)| . . . |p(x,y)−p(x+S,y)|, |p(x,y)−p(x−y)−p(x−S,y)|. Note that the absolute differences may also be computed such that the neighboring pixel in the shift range is the first term and the pixel of interest is the second term. Referring to the example of FIG. 6, if S=3 and the pixel of interest is p40, the following absolute differences are computed between p40 and each of p39, p38, p37, p41, p42, and p43. If there are Z pixels of interest in the filtered image, Z*2S absolute differences are computed for the filtered image.

After the absolute differences are computed, a statistical measure of the efficacy of the test filter is computed based on these absolute differences. Any suitable technique for computing the statistical measure may be used. For example, the statistical measure may be the mean of the absolute differences, the median of the absolute differences, or the sum of the absolute differences.

The method is repeated 510 for each parameter set that is to be considered. Then, the test filter with the best efficacy measure, e.g., the one having the largest values for its statistical measure, is selected as the SAF.

In some embodiments, an exhaustive search across all possible parameter sets may be performed. In some embodiments, a coarse-to-fine search strategy may be used to select the parameter sets to be considered. In some embodiments, convex optimization may be used to select the parameter sets to be considered. In some embodiments, the parameter sets to be considered may be bounded based on empirical observations and tests. For example, using a filter that is too large can causes mismatches in the stereo matching process. Accordingly, the maximum values of the size parameters may be limited, e.g., to a 51×51 filter. Further, rather than considering all scales, testing may show that some scale factors tend to yield better results than others. Further, exhaustive testing of all scale factors may not yield a better result than testing across some selected values. This information may be used to bound the values of the scale factors considered. For example, a large scaling factor may yield better results than a smaller one and a logarithmic sampling of scale factors, e.g., from 1 to 1024, provides results that are comparable to testing all scale in less time.

Figures 6, 7:
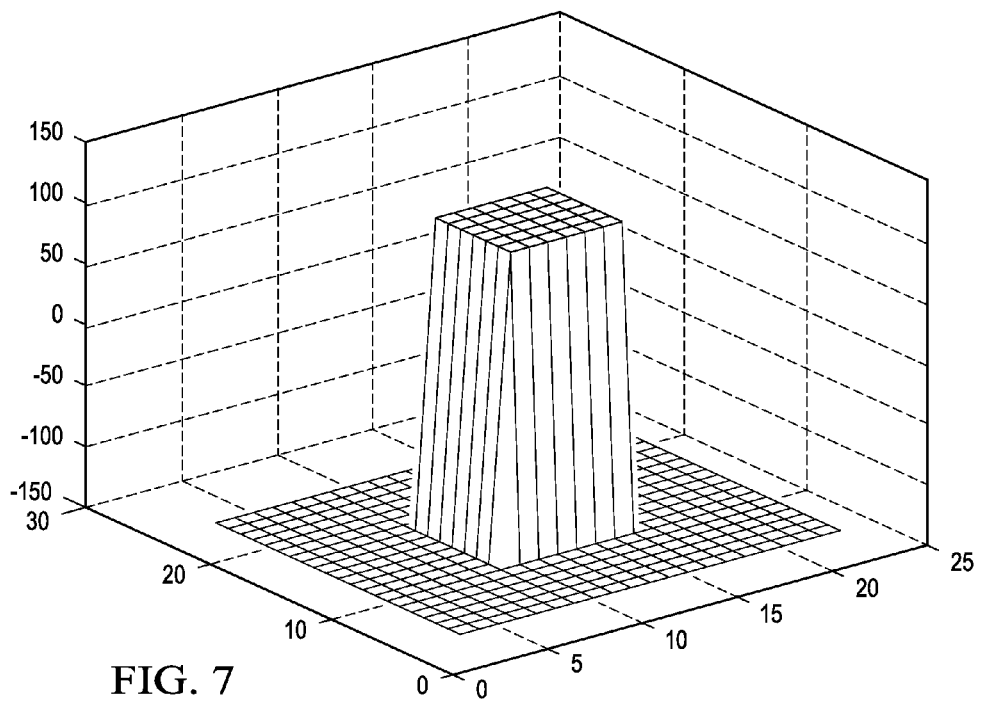

FIG. 7 is a graph illustrating generically the shape of a pseudo-log box filter learned by the method of FIG. 3. The outer box is a very high negative weight and the inner box is a very high positive weight. This filter tends to bring out low texture in an image, while not amplifying noise.

Tests were run with SAFs generated using the methods of FIG. 2 and FIG. 5 and an implementation approximating the well-known LoG filter of Marr with two box average filters. For the non-parametric SAF, M=N=9 and S=5. The parametric SAF was a pseudo-log filter in which the parameter sets were bounded by a maximum width and height of 21 and scales in the range 1-128. Also, for the parameter SAF, S=5. The "density of the disparity image", i.e., the percentage of pixels with a valid disparity measurement, was used as the quality metric. FIGS. 8A-8H show comparative results for an outdoor daylight scene, FIGS. 9A-9H show comparative results for an outdoor night scene, and FIGS. 10A-10F show comparative results for an indoor scene.

Figure 8A:
FIGS. 8A-8H, 9A-9H, and 10A-10F illustrate the use of various filters on various images.
Figure 8B:
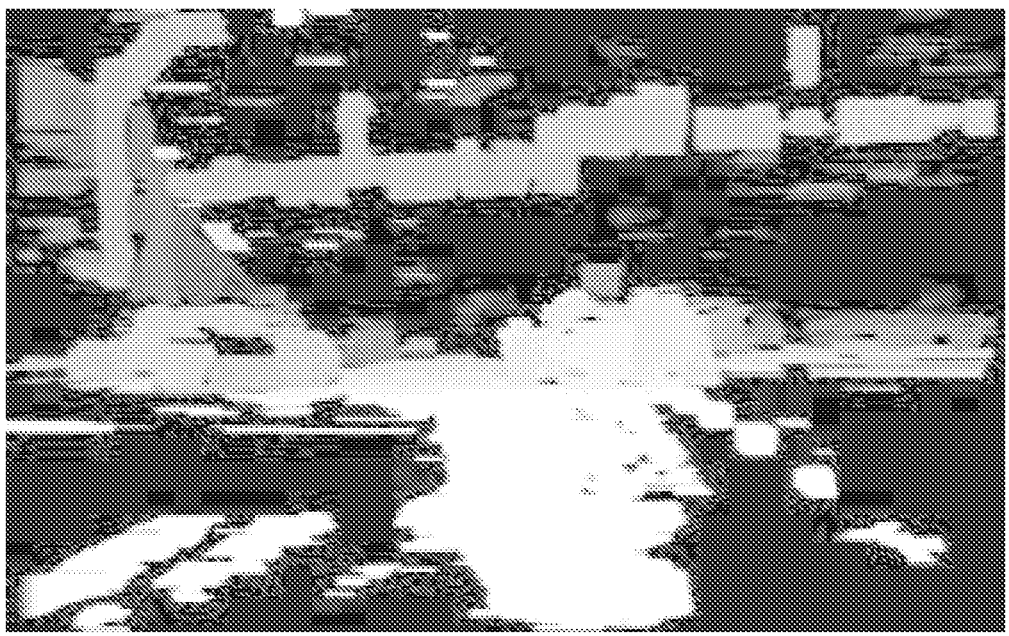
Figure 8C:
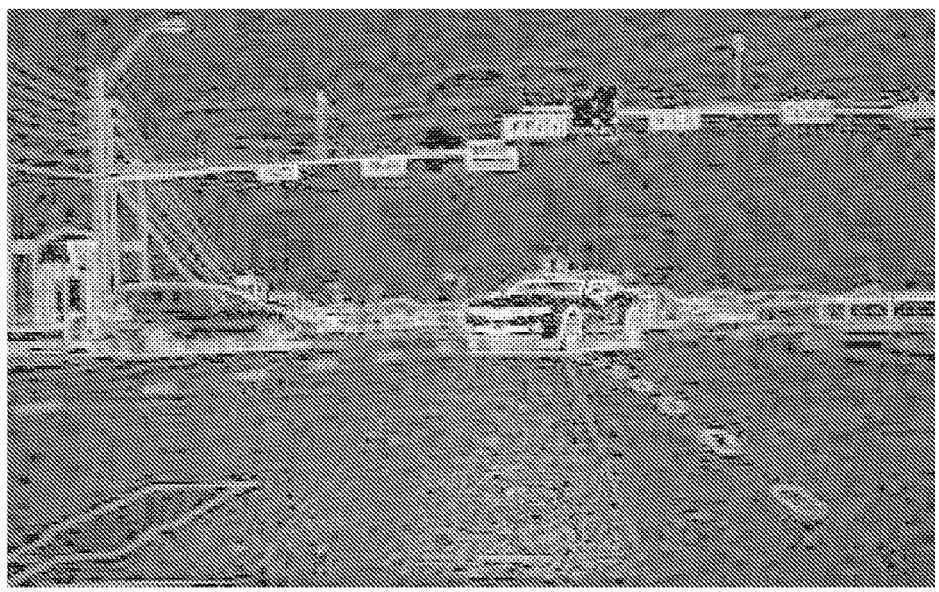
Figure 8D:
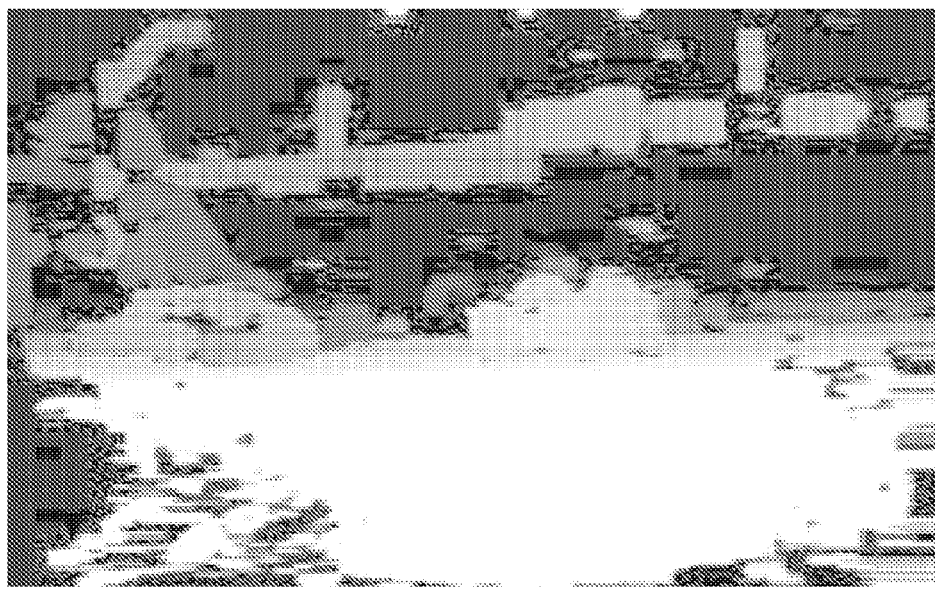
Figure 8E:
Figure 8F:
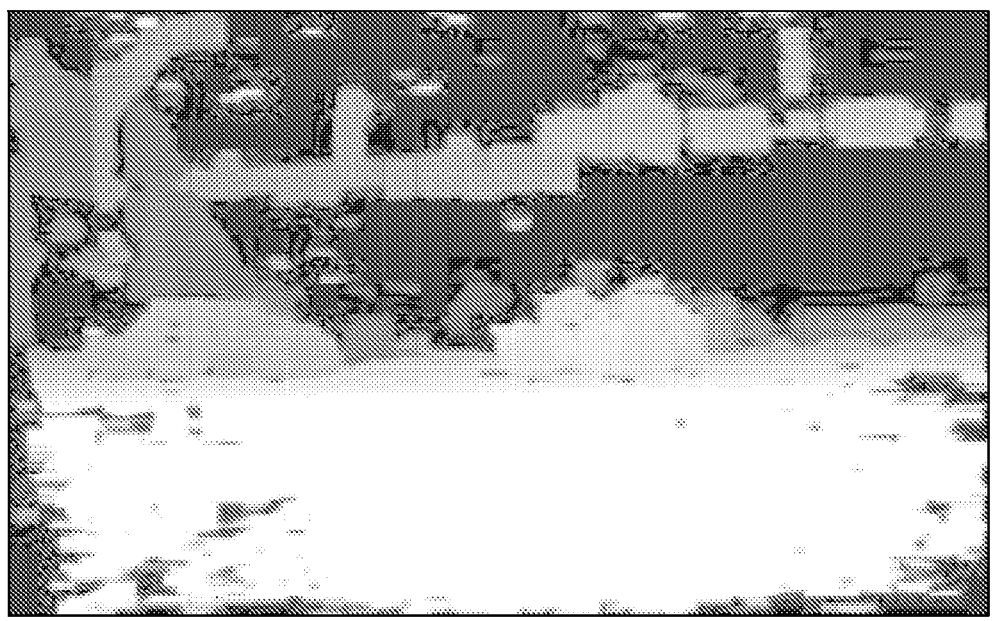
Figure 8G:
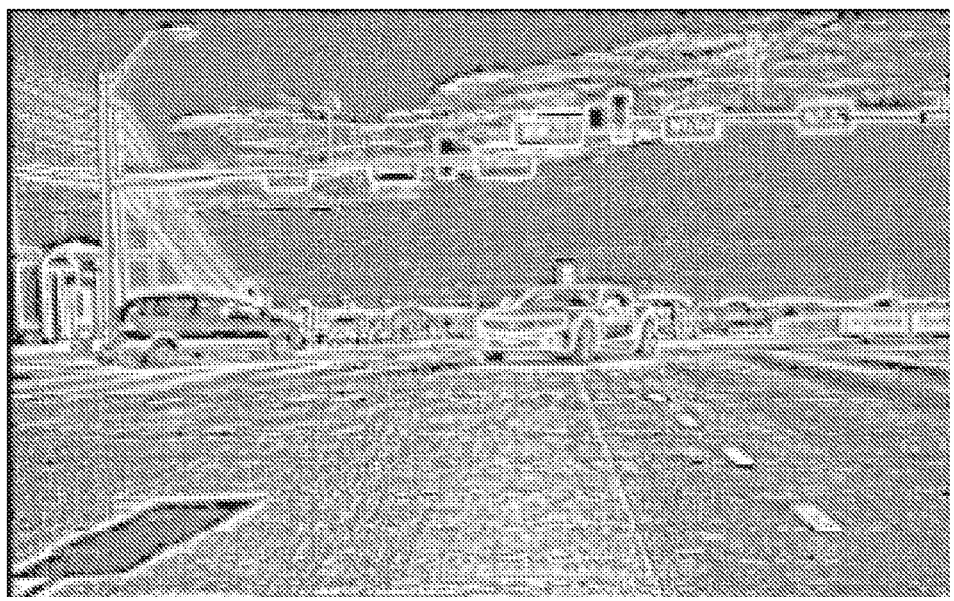
Figure 8H:
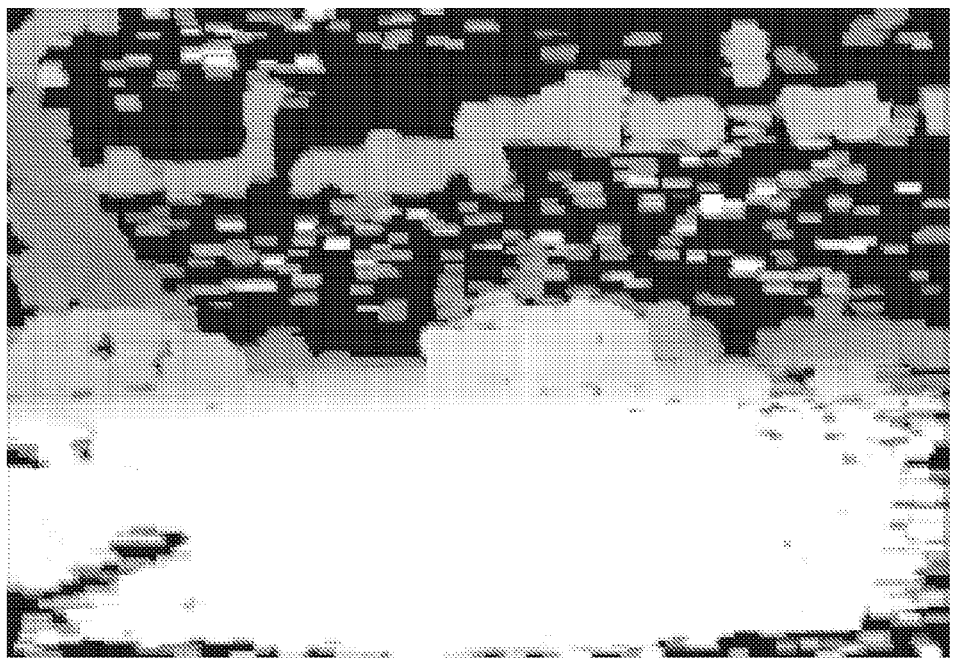

Referring now to FIGS. 8A-8H, FIG. 8A shows the original image of the outdoor daylight scene and FIG. 8B shows the disparity image for the image of FIG. 8A with no preprocessing filter applied. FIG. 8C shows the image of FIG. 8A after the preprocessing LoG filter was applied and FIG. 8D shows the disparity image for the image of FIG. 8C. FIG. 8E shows the image of FIG. 8A after the non-parametric preprocessing SAF was applied and FIG. 8F shows the disparity image for the image of FIG. 8E. FIG. 8G shows the image of FIG. 8A after the parametric preprocessing SAF was applied and FIG. 8H shows the disparity image for the image of FIG. 8G. In general, for this scene, the LoG filter improved the disparity density from approximately 35% to approximately 51% and the parametric and non-parametric SAF provided better results, improving the disparity density to approximately 58%.

Figure 9A:
Figure 9B:
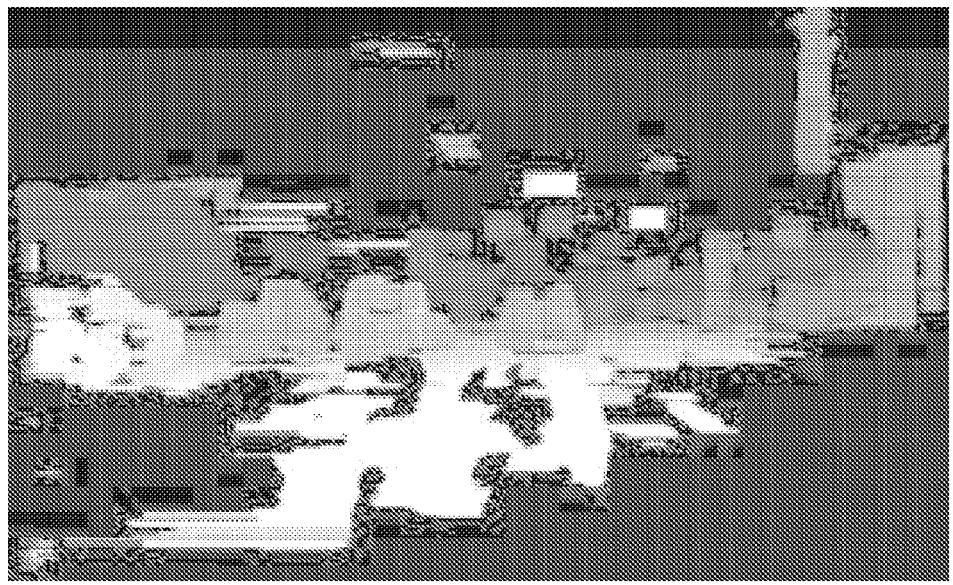
Figure 9C:
Figure 9D:
Figure 9E:
Figure 9F:
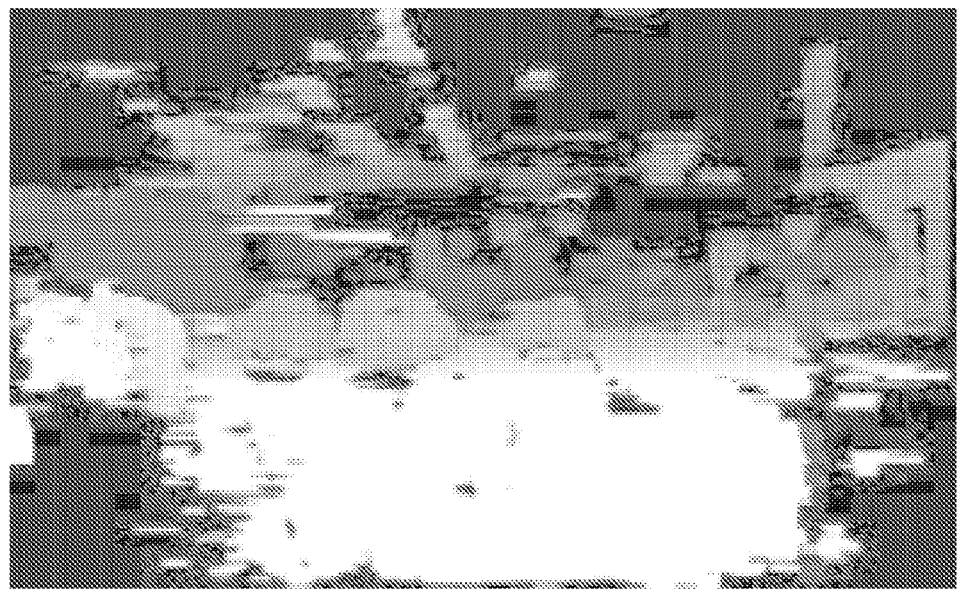
Figure 9G:
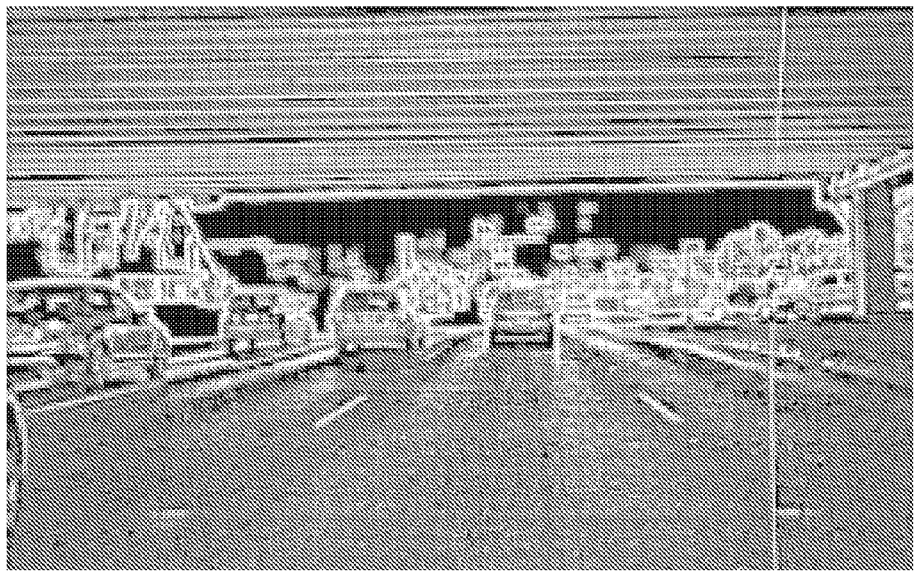
Figure 9H:
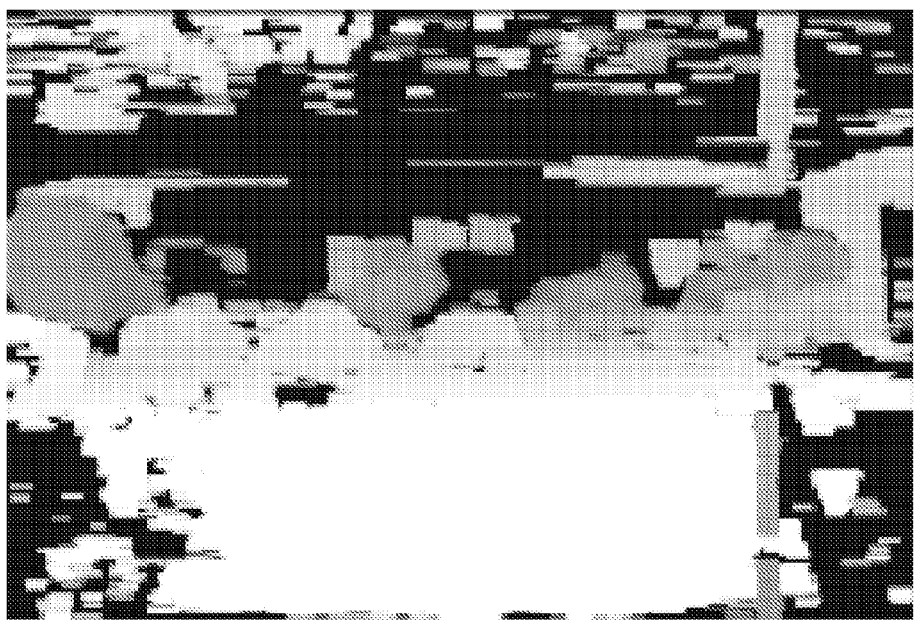

Referring now to FIGS. 9A-9H, FIG. 9A shows the original image of the outdoor night scene and FIG. 9B shows the disparity image for the image of FIG. 9A with no preprocessing filter applied. FIG. 9C shows the image of FIG. 9A after the preprocessing LoG filter was applied and FIG. 9D shows the disparity image for the image of FIG. 9C. FIG. 9E shows the image of FIG. 9A after the non-parametric preprocessing SAF was applied and FIG. 9F shows the disparity image for the image of FIG. 9E. The density of this disparity image is 50.8%. FIG. 9G shows the image of FIG. 9A after the parametric preprocessing SAF was applied and FIG. 9H shows the disparity image for the image of FIG. 9G. In general, for this scene, the LoG filter improved the disparity density from approximately 30% to approximately 44% and the parametric and non-parametric SAF provided better results, improving the disparity density to approximately 51%.

Figure 10A:
Figure 10B:
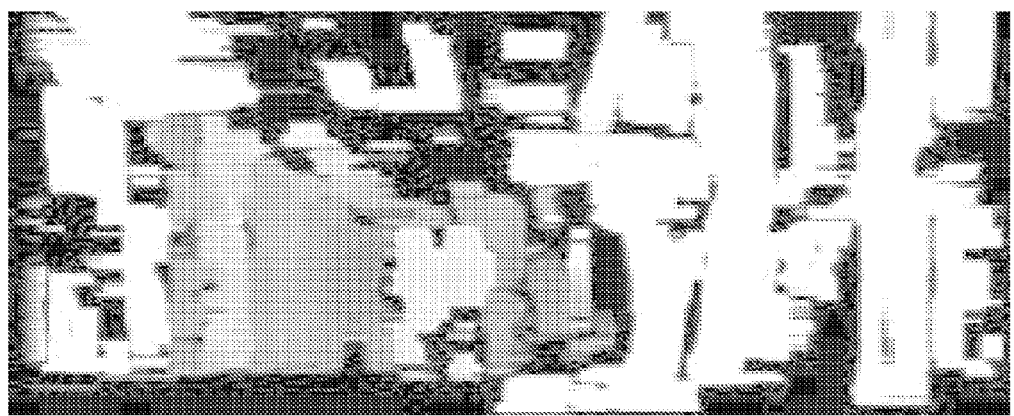
Figure 10C:
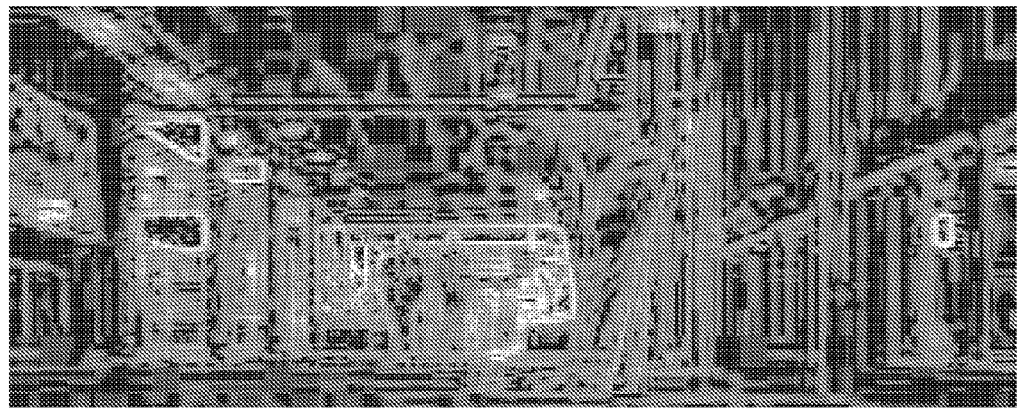
Figure 10D:
Figure 10E:
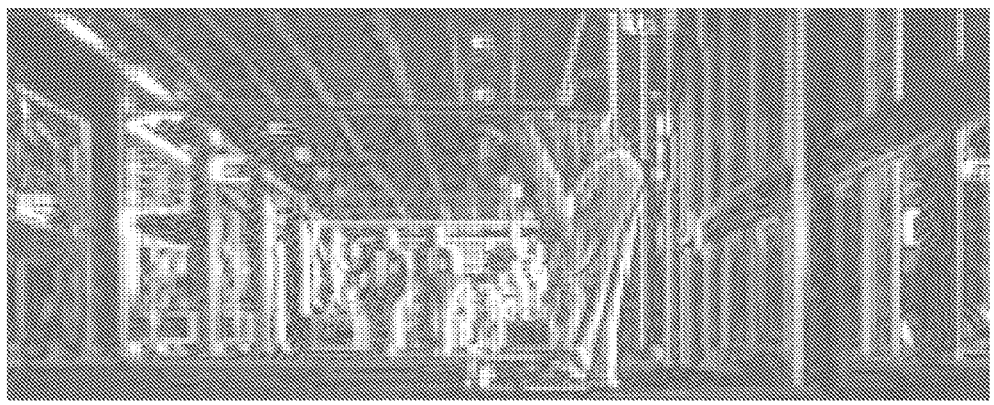
Figure 10F:

Referring now to FIGS. 10A-10F, FIG. 10A shows the original image of the indoor scene and FIG. 10B shows the disparity image for the image of FIG. 10A with no preprocessing filter applied. FIG. 10C shows the image of FIG. 10A after the preprocessing LoG filter was applied and FIG. 10D shows the disparity image for the image of FIG. 10C. FIG. 10E shows the image of FIG. 10A after the non-parametric preprocessing SAF was applied and FIG. 10F shows the disparity image for the image of FIG. 10E. In general, for this scene, the LoG filter decreased the disparity density from approximately 62% to approximately 49% and the non-parametric SAF improved the the disparity density from approximately to approximately 68%.

Figure 11A:
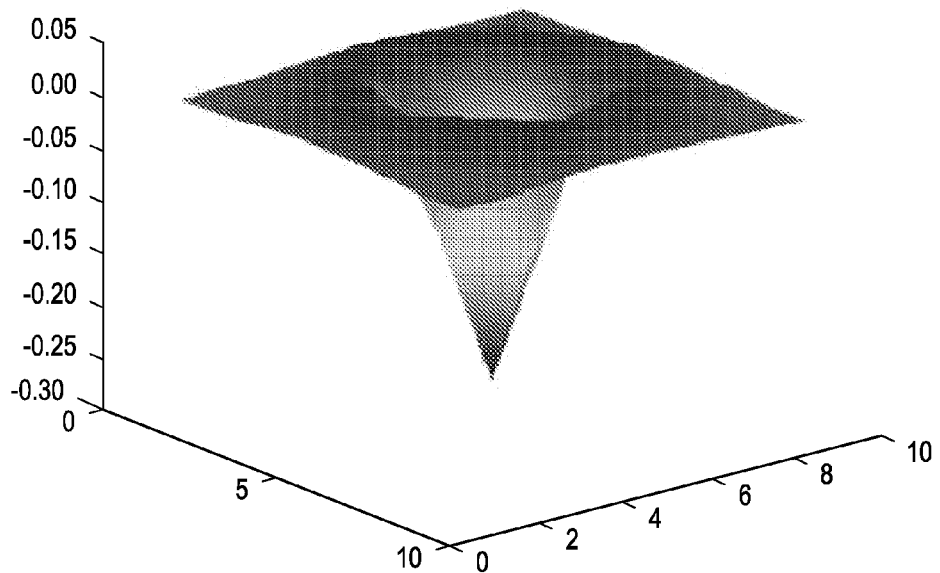
FIGS. 11A-11D are graphical representations of the filters of FIGS. 8A-8H, 9A-9H, and 10A-10F.
Figure 11B:
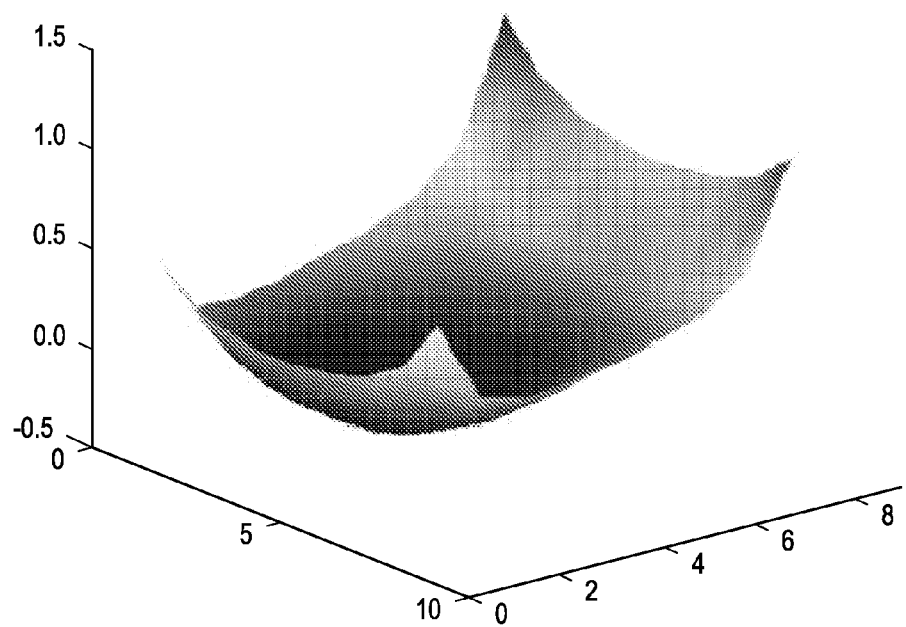
Figure 11C:
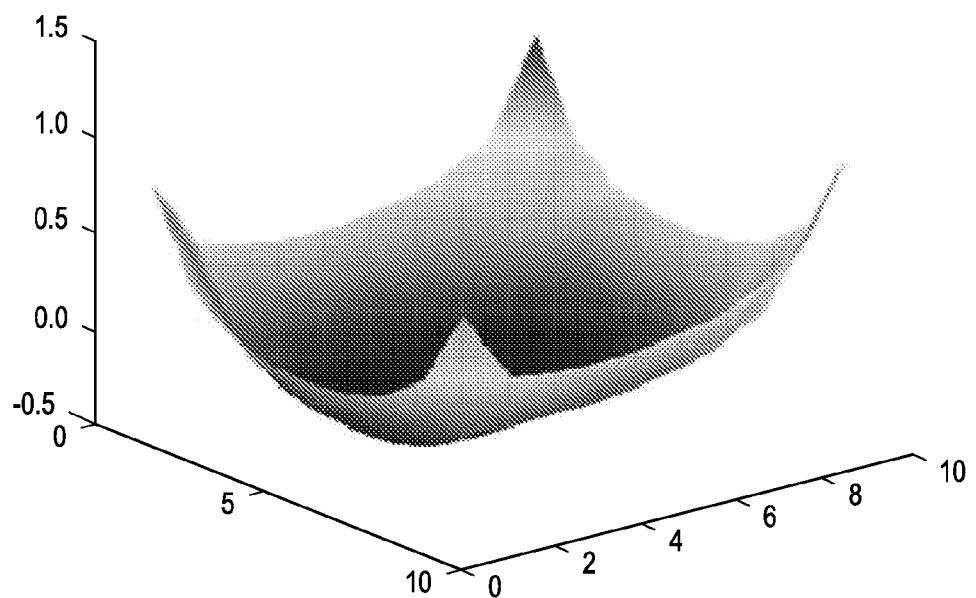
Figure 11D:
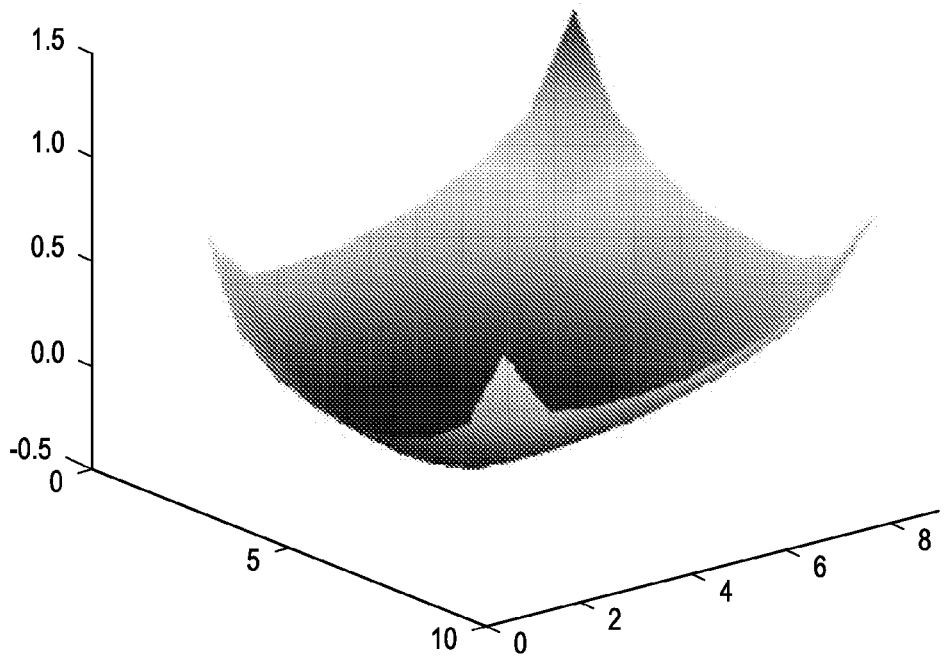

FIGS. 11A-11D are graphs illustrating the differences between the LoG filter (FIG. 11A) and the non-parametric 9×9 SAFs (FIGS. 11B-11D) computed for each of the three images, i.e., the images of FIG. 8A, FIG. 9A, and FIG. 10A. Note that these filters have the "surround-center" shape, meaning they have a zero-centered smoothing blob surrounded by a tail of opposite sign. Table 1 shows the coefficients of the 9×9 non-parametric SAF computed for the image of FIG. 10A and FIG. 11B is the graphical representation of this SAF.

In some embodiments, an SAF can be tuned to end application. That is, the SAF can be computed according to the image matching technique and metrics that are used in the stereo matching algorithm. This is a significant deviation from current known approaches in which the preprocessing filter is designed without consideration of the stereo matching problem. Further, in the computation of a non-parametric SAF or a parametric SAF, the inherent characteristics of the scene as well as the imaging sensor system are automatically captured. Further, SAFs may be used to naturally adapt to imaging conditions such as illumination in the scene or the exposure of the imaging sensors. SAFs also naturally adapt to the visual structure and statistics of the scene. Further, they can be tuned to specific regions of the image. Non-parametric SAFs may also computationally efficient to estimate and to apply at run-time.

Figure 12:
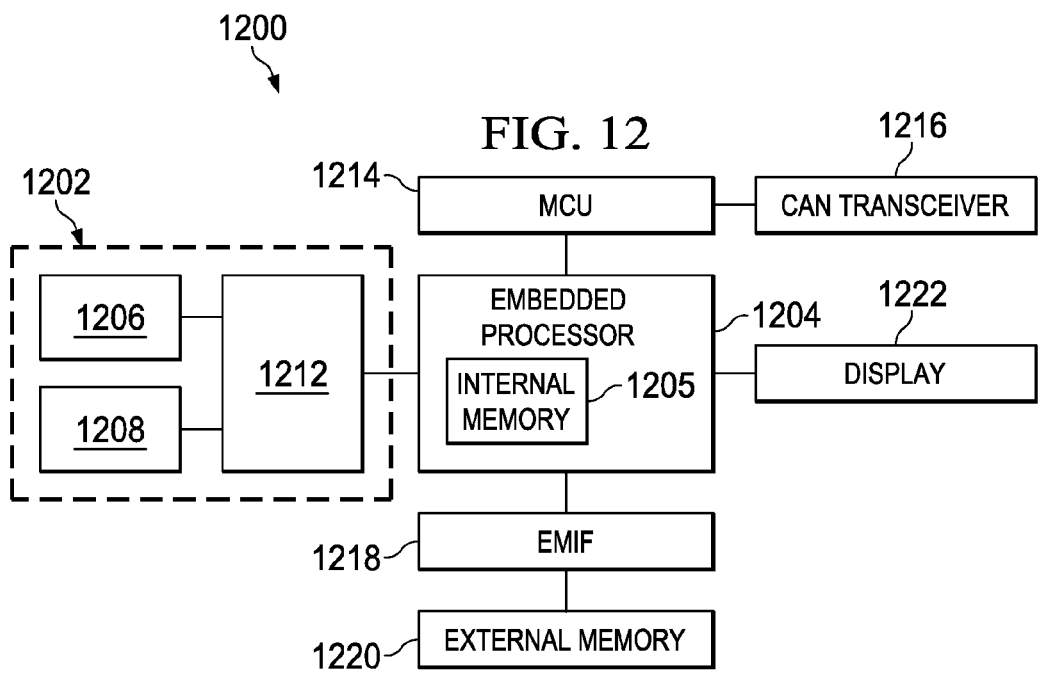
FIG. 12 is a block diagram of an automotive vision control system.

FIG. 12 is a block diagram of an embedded automotive vision control system 1200 suitable for use in a vehicle that may be configured to design SAFs for preprocessing filtering of stereo images as described herein. The stereoscopic imaging system 1202 includes left and right imaging components 1206, 1208 and a controller component 1212 for capturing the data needed to generate a stereoscopic video sequence. The imaging components 1206, 1208 may be imaging sensor systems arranged to capture image signals of a scene from a left viewpoint and a right viewpoint. That is, the imaging sensor system in the left imaging component 1206 may be arranged to capture an image signal from the left viewpoint, i.e., a left analog image signal, and the imaging sensor system in the right imaging component 1208 may be arranged to capture an image signal from the right view point, i.e., a right analog image signal. Each of the imaging sensor systems includes a lens assembly, a lens actuator, an aperture, and an imaging sensor. The stereoscopic imaging system 1202 also includes circuitry for controlling various aspects of the operation of the system, such as, for example, aperture opening amount, exposure time, etc. The controller module 1212 includes functionality to convey control information from the embedded processor 1204 to the imaging sensor systems 1206, 1208, to convert the left and right analog image signals to left and right digital image signals, and to provide the left and right digital image signals to the embedded processor 1204 for further processing.

Software instructions implementing the functionality of the rectification, preprocessing filtering, disparity estimation, and disparity refinement components of FIG. 1 may be stored in the external memory 1220 and executed by the embedded processor to generate disparity images for the stereoscopic images received from the stereoscopic imaging system 1202. Software instructions implementing a driver assistance application needing 3D vision information such as forward collision warning, visual parking, and/or navigation assistance, automatic braking control, etc., may also be stored in the external memory 1220 and executed on the embedded processor. The application software instructions may implement an embodiment of the method for parametric SAF design or the method for non-parametric SAF design as described herein to design an SAF for application by the preprocessing filtering. The software instructions may be initially stored in a computer readable medium and loaded and executed by the embedded processor 1204. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, random access memory, or a combination thereof.

The embedded processor 1204 may be any suitable processor that provides the computation performance needed for

TABLE 1

| | | | | | | | | |
|---|---|---|---|---|---|---|---|---|
| 0.30835 | 0.102154 | 0.023077 | −0.01552 | −0.02217 | 0.001972 | 0.064563 | 0.189818 | 0.483531 |
| −0.07379 | −0.26591 | −0.34414 | −0.37969 | −0.38417 | −0.36097 | −0.30356 | −0.1923 | 0.045298 |
| −0.09042 | −0.27364 | −0.35485 | −0.39052 | −0.39562 | −0.37558 | −0.32409 | −0.22371 | −0.01785 |
| −0.03845 | −0.21693 | −0.29661 | −0.33106 | −0.33829 | −0.32072 | −0.27466 | −0.18232 | 0.007738 |
| 0.027727 | −0.15093 | −0.23197 | −0.26823 | −0.2753 | −0.25751 | −0.21401 | −0.12655 | 0.05221 |
| 0.100384 | −0.08507 | −0.17071 | −0.2112 | −0.22015 | −0.20283 | −0.15905 | −0.07233 | 0.103119 |
| 0.208562 | 0.010755 | −0.08306 | −0.13013 | −0.14325 | −0.12709 | −0.08311 | 0.003552 | 0.180148 |
| 0.433904 | 0.209611 | 0.105803 | 0.050553 | 0.031716 | 0.044137 | 0.084242 | 0.168716 | 0.351031 |
| 1.054863 | 0.797259 | 0.682174 | 0.62048 | 0.597068 | 0.605438 | 0.640505 | 0.715072 | 0.894469 | stereo vision processing, such as, for example, a digital signal processor or a general purpose processor. The internal memory 1205 may be any suitable memory design, e.g., static random access memory (SRAM). The embedded processor 1204 is coupled to external memory 1220 via an external memory interface (EMIF) 1218. The embedded processor 1204 included functionality to move instructions and/or data between the external memory 1220 and the internal memory 1205 via the EMIF 1218 as needed for stereo image processing, e.g., generation of disparity images, and application processing.

The external memory 1220 may be any suitable memory design may be used. For example, the external memory 1220 may include DRAM such as synchronous DRAM (SDRAM) or double data rate DRAM (DDR DRAM), flash memory, a combination thereof, or the like.

The display 1222 may be a display device capable of displaying stereo images or a display device capable of displaying two-dimensional images. In the latter case, images captured by one of the imaging components 102, 104 are displayed on the display 1222. The information provided on the display depends on the particular application or applications of the system 1200. For example, the display 1222 may be used by a parking assistance application.

The microcontroller (MCU) 1214 may be a general purpose microcontroller configured to handle system control functions such as steeper motors in real time as well as communication with other modules in the vehicle. The controller area network (CAN) transceiver provides a network protocol for serial communication with various control modules in the vehicle.

In operation, the embedded processor 1204 may receive a sequence of left and right digital images of a stereo video sequence from the stereoscopic imaging system 1202, execute software instructions stored in the external memory 1205 to perform rectification, preprocessing filtering, disparity estimation, and disparity refinement as previously described herein to generate disparity images, and provide the disparity images to one or more driver assistance applications. The preprocessing filtering applies an SAF to the left and right rectified images. The left and right images are stored in the external memory 1220 and portions of the images are read into the internal memory 1205 as needed for the generation of the disparity images.

A driver assistance application may further process the disparity images to provide vision based assistance to a driver. For example, the driver assistance application may derive information about the scene from the disparity images that allows it to detect that a collision with an object is imminent. The driver assistance application may then communicate with the MCU 1214 to request that the MCU 1214 interact with a brake control module to slow the vehicle down and may also cause a visual alarm to be displayed on scene shown in the display 1222 and/or cause an audible alarm to be initiated.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments of the invention have been described herein assuming stereo video. Stereo video is just one example of 3D multi-view video. In general, 3D multi-view video includes two or more corresponding 2D video sequences of a scene captured by two or more cameras concurrently in differing locations. One of ordinary skill in the art, having benefit of this disclosure, will understand embodiments in which an SAF is designed and applied to multi-view video. For example, a multi-view image processing system may include more than two imaging components. A representative 2D image may be selected from the 2D images captured by one of the imaging components and an SAF designed according to methods described herein. The SAF may then be applied to the images captured by each of the imaging components.

In another example, rather than performing rectification, preprocessing filtering, and disparity selection in parallel as depicted herein, theses operations may be performed serially. For example, there may be a single rectification component and a single preprocessing filter component for rectifying and filtering the left and right images.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method comprising:
generating coefficients of a scene adaptive filter (SAF) based on differences between values of neighboring pixels in a representative two dimensional (2D) image; and
applying the SAF to a plurality of corresponding 2D images, wherein generating coefficients comprises applying each test filter of a plurality of test filters to the 2D image, computing a statistical measure of efficacy for each test filter based on absolute differences computed for each pixel of interest of a plurality of pixels of interest in the 2D image as filtered by the test filter, wherein the absolute differences for a pixel of interest are absolute differences between the pixel of interest and each pixel in a horizontal shift range centered on the pixel of interest; and selecting coefficients of a test filter of the plurality of test filters having a best statistical measure as the SAF coefficients.

2. The method of claim 1, wherein generating coefficients further comprises generating the plurality of test filters based on a parameterized filter model, wherein each test filter is generated according to differing parameter values.

3. The method of claim 1, wherein the plurality of pixels of interest includes every pixel in the 2D image.

4. The method of claim 1, wherein generating coefficients comprises:
computing, for each pixel of interest of a plurality of pixels of interest in the 2D image, absolute differences between corresponding pixels in a base M×N window centered on the pixel of interest and comparison M×N windows, wherein each comparison M×N window is centered on a pixel in a horizontal shift range centered on the pixel of interest, and wherein M and N are dimensions of the SAF;
computing raw coefficient values for each coefficient position of the SAF filter by summing the absolute differences computed for a corresponding pixel location in each base M×N window; and
normalizing the raw coefficient values to generate final coefficient values.

5. The method of claim 4, wherein the plurality of pixels of interest includes every pixel in the 2D image.

6. An apparatus comprising:
means for generating coefficients of a scene adaptive filter (SAF) based on differences between values of neighboring pixels in a representative two dimensional (2D) image; and
means for applying the SAF to a plurality of corresponding 2D images, wherein the means for generating coefficients comprises means for applying each test filter of a plurality of test filters to the 2D image, means for computing a statistical measure of efficacy for each test filter based on absolute differences computed for each pixel of interest of a plurality of pixels of interest in the 2D image as filtered by the test filter, wherein the absolute differences for a pixel of interest are absolute differences between the pixel of interest and each pixel in a horizontal shift range centered on the pixel of interest, and means for selecting coefficients of a test filter of the plurality of test filters having a best statistical measure as the SAF coefficients.

7. The apparatus of claim 6, wherein the means for generating coefficients further comprises means for generating the plurality of test filters based on a parameterized filter model, wherein each test filter is generated according to differing parameter values.

8. The apparatus of claim 6, wherein the plurality of pixels of interest includes every pixel in the 2D image.

9. The apparatus of claim 6, wherein the means for generating coefficients comprises:
means for computing, for each pixel of interest of a plurality of pixels of interest in the 2D image, absolute differences between corresponding pixels in a base M×N window centered on the pixel of interest and comparison M×N windows, wherein each comparison M×N window is centered on a pixel in a horizontal shift range centered on the pixel of interest, and wherein M and N are dimensions of the SAF;
means for computing raw coefficient values for each coefficient position of the SAF filter by summing the absolute differences computed for a corresponding pixel location in each base M×N window; and
means for normalizing the raw coefficient values to generate final coefficient values.

10. The apparatus of claim 9, wherein the plurality of pixels of interest includes every pixel in the 2D image.

11. A non-transitory computer readable medium storing software instructions that, when executed by a processor, cause the performance of a method comprising:
generating coefficients of a scene adaptive filter (SAF) based on differences between values of neighboring pixels in a representative two dimensional (2D) image; and
applying the SAF to a plurality of corresponding 2D images, wherein generating coefficients comprises applying each test filter of a plurality of test filters to the 2D image, computing a statistical measure of efficacy for each test filter based on absolute differences computed for each pixel of interest of a plurality of pixels of interest in the 2D image as filtered by the test filter, wherein the absolute differences for a pixel of interest are absolute differences between the pixel of interest and each pixel in a horizontal shift range centered on the pixel of interest, and selecting coefficients of a test filter of the plurality of test filters having a best statistical measure as the SAF coefficients.

12. The computer readable medium of claim 11, wherein generating coefficients further comprises generating the plurality of test filters based on a parameterized filter model, wherein each test filter is generated according to differing parameter values.

13. The computer readable medium of claim 11, wherein the plurality of pixels of interest includes every pixel in the 2D image.

14. The computer readable medium of claim 11, wherein generating coefficients comprises:
computing, for each pixel of interest of a plurality of pixels of interest in the 2D image, absolute differences between corresponding pixels in a base M×N window centered on the pixel of interest and comparison M×N windows, wherein each comparison M×N window is centered on a pixel in a horizontal shift range centered on the pixel of interest, and wherein M and N are dimensions of the SAF;
computing raw coefficient values for each coefficient position of the SAF filter by summing the absolute differences computed for a corresponding pixel location in each base M×N window; and
normalizing the raw coefficient values to generate final coefficient values.

15. The computer readable medium of claim 14, wherein the plurality of pixels of interest includes every pixel in the 2D image.

* * * * *